(12) United States Patent
Watanobe et al.

(10) Patent No.: US 11,920,222 B2
(45) Date of Patent: Mar. 5, 2024

(54) COMPOSITE SINTERED MATERIAL

(71) Applicants: Sumitomo Electric Industries, Ltd., Osaka (JP); SUMITOMO ELECTRIC HARDMETAL CORP., Itami (JP)

(72) Inventors: Naoki Watanobe, Osaka (JP); Takashi Harada, Osaka (JP); Katsumi Okamura, Osaka (JP); Satoru Kukino, Itami (JP); Taisuke Higashi, Itami (JP)

(73) Assignees: Sumitomo Electric Industries, Ltd., Osaka (JP); Sumitomo Electric Hardmetal Corp., Itami (JP)

( * ) Notice: Subject to any disclaimer, the term of this patent is extended or adjusted under 35 U.S.C. 154(b) by 681 days.

(21) Appl. No.: 17/049,599

(22) PCT Filed: Apr. 3, 2019

(86) PCT No.: PCT/JP2019/014776
§ 371 (c)(1),
(2) Date: Oct. 22, 2020

(87) PCT Pub. No.: WO2019/208133
PCT Pub. Date: Oct. 31, 2019

(65) Prior Publication Data
US 2021/0238716 A1    Aug. 5, 2021

(30) Foreign Application Priority Data

Apr. 24, 2018  (JP) .................... 2018-083374

(51) Int. Cl.
C22C 26/00    (2006.01)
B23B 27/14    (2006.01)
C22C 1/05     (2023.01)

(52) U.S. Cl.
CPC ............ C22C 26/00 (2013.01); B23B 27/148 (2013.01); C22C 1/05 (2013.01); B23B 2226/31 (2013.01);
(Continued)

(58) Field of Classification Search
None
See application file for complete search history.

(56) References Cited

U.S. PATENT DOCUMENTS

| | | | |
|---|---|---|---|
| 4,902,652 A | 2/1990 | Kume et al. | |
| 2006/0191722 A1* | 8/2006 | Belnap | B22F 1/12 |
| | | | 175/374 |

(Continued)

FOREIGN PATENT DOCUMENTS

| | | |
|---|---|---|
| CN | 106232553 A | 12/2016 |
| JP | S56-022676 A | 3/1981 |

(Continued)

*Primary Examiner* — George Wyszomierski
(74) *Attorney, Agent, or Firm* — McCarter & English, LLP; Michael A. Sartori (57) ABSTRACT

A composite sintered material includes: a plurality of diamond grains having an average grain size of less than or equal to 10 μm; a plurality of cubic boron nitride grains having an average grain size of less than or equal to 2 μm; and a plurality of aluminum oxide grains having an average grain size of less than or equal to 0.5 μm; and a remainder of a binder phase, wherein at least parts of adjacent diamond grains are bound to one another, the binder phase includes cobalt, in the composite sintered material, a content of the diamond grains is from 30 to 92 volume %, a content of the cubic boron nitride grains is from 3 to 40 volume %, a content of the aluminum oxide grains is from 2 to 15 volume %, and a content of the cobalt is from 3 to 30 volume %.

11 Claims, 2 Drawing Sheets

(52) U.S. Cl.
CPC .. *C22C 2026/007* (2013.01); *C22C 2026/008* (2013.01)

(56) References Cited

U.S. PATENT DOCUMENTS

| | | |
|---|---|---|
| 2008/0214383 A1 | 9/2008 | Matsukawa et al. |
| 2008/0254282 A1 | 10/2008 | Kukino et al. |
| 2015/0041224 A1 | 2/2015 | Digiovanni |
| 2016/0251742 A1* | 9/2016 | Kanyanta ............... C22C 29/005 51/307 |
| 2017/0173702 A1 | 6/2017 | Chihara et al. |
| 2019/0271062 A1* | 9/2019 | Okamura ................ C22C 26/00 |
| 2020/0078868 A1 | 3/2020 | Hirano et al. |
| 2020/0269321 A1* | 8/2020 | Wang ..................... C22C 26/00 |

FOREIGN PATENT DOCUMENTS

| | | |
|---|---|---|
| JP | S64-017836 A | 1/1989 |
| JP | H04-21568 A | 1/1992 |
| JP | H09-143512 A | 6/1997 |
| JP | H09-316587 A | 12/1997 |
| JP | 2005-239472 A | 9/2005 |
| JP | 2014-531967 A | 12/2014 |
| WO | 2005/066381 A1 | 7/2005 |
| WO | 2007/039955 A1 | 4/2007 |
| WO | 2007/039955 A1 | 12/2007 |
| WO | 2013/028821 A1 | 2/2013 |
| WO | 2017/094628 A1 | 6/2017 |

\* cited by examiner

COMPOSITE SINTERED MATERIAL

TECHNICAL FIELD

The present disclosure relates to a composite sintered material. The present application claims a priority based on Japanese Patent Application No. 2018-083374 filed on Apr. 24, 2018, the entire content of which is incorporated herein by reference.

BACKGROUND ART

Japanese Patent Laying-Open No. 2005-239472 (Patent Literature 1) discloses a high-strength and high-wear-resistance diamond sintered material including: sintered diamond grains having an average grain size of less than or equal to 2 μm; and a remainder of a binder phase, wherein a content of the sintered diamond grains in the diamond sintered material is more than or equal to 80 volume % and less than or equal to 98 volume %, the binder phase includes cobalt and at least one element selected from a group consisting of titanium, zirconium, hafnium, vanadium, niobium, tantalum, chromium, and molybdenum, a content of the at least one element in the binder phase being more than or equal to 0.5 mass % and less than 50 mass %, a content of the cobalt in the binder phase being more than or equal to 50 mass % and less than 99.5 mass %, a part or whole of the at least one element selected from the group consisting of titanium, zirconium, hafnium, vanadium, niobium, tantalum, chromium, and molybdenum is present as carbide grains having an average grain size of less than or equal to 0.8 μm, a carbide grain structure is discontinuous, and adjacent sintered diamond grains are bound to one another.

Japanese Patent Laying-Open No. 9-316587 (Patent Literature 2) discloses a high-strength fine-grain diamond sintered material including: sintered diamond grains; and a remainder of a binder, wherein each of the sintered diamond grains has a grain size falling within a range of 0.1 to 4 μm, the binder includes at least one iron group metal selected from a group consisting of Fe, Co, and Ni, and an oxygen content falls within a range of 0.01 to 0.08 weight %.

Japanese Patent Laying-Open No. 1-17836 (Patent Literature 3) discloses a diamond sintered material constituted of a sintered material obtained by sintering diamond raw material powder particles under a ultra-high pressure and a high temperature, each of the diamond raw material powder particles being uniformly coated with 6 to 0.1 volume % of a group 4a, 5a, or 6a transition metal in the periodic table, boron, or silicon, wherein the diamond sintered material contains 94 to 99.8 volume % of diamond and a remainder of a carbide of the coating material.

Japanese National Patent Publication No. 2014-531967 (Patent Literature 4) discloses a polycrystalline diamond compact comprising: a polycrystalline diamond body comprising a material microstructure comprising a plurality of bonded-together, diamond grains and interstitial regions between the diamond grains; a substrate comprising tungsten and a catalyst metal; and a grain growth inhibitor layer between the polycrystalline diamond body and the substrate, the grain growth inhibitor layer comprising a plurality of titanium-containing particles interspersed with tungsten and the catalyst metal, wherein the titanium-containing particles are less than 800 nanometers in size, wherein the grain growth inhibitor layer is bonded to the substrate and to the polycrystalline diamond body at opposite sides, and is about 20-100 microns in thickness, and wherein the diamond grains have an average size of about 1 micron or less.

WO 2007/039955 (Patent Literature 5) discloses a cBN sintered body for high surface integrity machining, comprising not less than 60% and not more than 95% of cBN (cubic boron nitride) component in volume %, having a thermal conductivity of 70 $W \cdot m^{-1} \cdot K^{-1}$ or more, and an outermost surface of the cBN sintered body being coated with a heat resistant film having a thickness of 0.5 to 12 μm and comprising a compound of at least one element selected from 4a, 5a, 6a group elements and Al, and at least one element selected from C, N and O.

WO 2005/066381 (Patent Literature 6) discloses a cubic boron nitride sintered body, which contains cubic boron nitride particles and a bonding material used for bonding the cBN particles to one another, comprising: cBN particles in a range from 70 vol % to 98 vol %; and a residual bonding material constituted by a Co compound, an Al compound and WC and a solid solution of these, wherein the cBN particles in the sintered body contain 0.03 wt % or less of Mg and 0.001 wt % or more to 0.05 wt % or less of Li.

CITATION LIST

Patent Literature

PTL 1: Japanese Patent Laying-Open No. 2005-239472
PTL 2: Japanese Patent Laying-Open No. 9-316587
PTL 3: Japanese Patent Laying-Open No. 1-17836
PTL 4: Japanese National Patent Publication No. 2014-531967
PTL 5: WO 2007/039955
PTL 6: WO 2005/066381

SUMMARY OF INVENTION

A composite sintered material according to a certain embodiment of the present disclosure includes: a plurality of diamond grains having an average grain size of less than or equal to 10 μm; a plurality of cubic boron nitride grains having an average grain size of less than or equal to 2 μm; a plurality of aluminum oxide grains having an average grain size of less than or equal to 0.5 μm; and a remainder of a binder phase, wherein at least parts of adjacent diamond grains are bound to one another, the binder phase includes cobalt, in the composite sintered material, a content of the diamond grains is more than or equal to 30 volume % and less than or equal to 92 volume %, a content of the cubic boron nitride grains is more than or equal to 3 volume % and less than or equal to 40 volume %, a content of the aluminum oxide grains is more than or equal to 2 volume % and less than or equal to 15 volume %, and a content of the cobalt is more than or equal to 3 volume % and less than or equal to 30 volume %.

DETAILED DESCRIPTION

Problem to be Solved by the Present Disclosure

In response to an increased airplane demand in recent years, it has been desired to process, at a high speed, a turbine disc and a blisk, which are main components of a jet engine and are composed of a heat-resistant alloy represented by Inconel (registered trademark) 718 (Ni-based alloy) or Ti-6Al-4V; however, currently, finish processing is performed using a carbide tool at a low cutting speed of about 50 m/min. Thus, there is no tool that satisfies the market need for the high-speed processing.

In each of the diamond sintered materials disclosed in Japanese Patent Laying-Open No. 2005-239472 (Patent Literature 1), Japanese Patent Laying-Open No. 9-316587 (Patent Literature 2), Japanese Patent Laying-Open No. 1-17836 (Patent Literature 3), and Japanese National Patent Publication No. 2014-531967 (Patent Literature 4), the main component, diamond, has a very high affinity to an alloy including an iron group element (group 8, 9 and 10 elements of period 4 in the periodic table, i.e., a general term of three elements of iron, cobalt, and nickel; the same applies to the description below) and/or titanium, is therefore highly reactive, starts to be carbonized at more than or equal to 600° C. in air to have a decreased hardness, and is burned at more than or equal to 800° C. in air. Hence, each of the diamond sintered materials is inferior in thermal stability. For this reason, it is commonly known that each of such diamond sintered materials is not used for high-speed processing of a heat-resistant alloy including an iron group element and/or titanium.

In each of the cubic boron nitride (cBN) sintered bodies disclosed in WO 2007/039955 (Patent Literature 5) and WO 2005/066381 (Patent Literature 6), the main component, cBN, has a low affinity to an alloy including an iron group element and/or titanium. Each of the cubic boron nitride (cBN) sintered bodies exhibits high wear resistance even in high-speed processing of a heat-resistant alloy composed of an alloy including an iron group element and/or titanium. However, since breakage resistance of each of the cBN sintered bodies is low, chipping occurs at an early stage in the high-speed processing of the heat-resistant alloy including an iron group element and/or titanium, thus failing to attain a practical life as a tool.

In order to solve the above-described problem, it is an object to provide a composite sintered material that is applicable also to high-speed processing of a heat-resistant alloy including an iron group element and/or titanium and that has both high wear resistance and high breakage resistance.

Advantageous Effect of the Present Disclosure

According to the description above, there can be provided a composite sintered material that is applicable also to high-speed processing of a heat-resistant alloy including an iron group element and/or titanium and that has both high wear resistance and high breakage resistance.

DESCRIPTION OF EMBODIMENTS

First, embodiments of the present disclosure are listed and described.

[1] A composite sintered material according to a certain embodiment of the present disclosure includes: a plurality of diamond grains having an average grain size of less than or equal to 10 μm; a plurality of cubic boron nitride grains having an average grain size of less than or equal to 2 μm; a plurality of aluminum oxide grains having an average grain size of less than or equal to 0.5 μm; and a remainder of a binder phase, wherein at least parts of adjacent diamond grains are bound to one another, the binder phase includes cobalt, in the composite sintered material, a content of the diamond grains is more than or equal to 30 volume % and less than or equal to 92 volume %, a content of the cubic boron nitride grains is more than or equal to 3 volume % and less than or equal to 40 volume %, a content of the aluminum oxide grains is more than or equal to 2 volume % and less than or equal to 15 volume %, and a content of the cobalt is more than or equal to 3 volume % and less than or equal to 30 volume %. The composite sintered material of the present embodiment has both high wear resistance and high breakage resistance.

[2] In the composite sintered material according to the present embodiment, the average grain size of the diamond grains can be less than or equal to 2 μm, and the average grain size of the cubic boron nitride grains can be less than or equal to 1 μm, and in the composite sintered material, the content of the diamond grains can be more than or equal to 50 volume % and less than or equal to 70 volume %, the content of the cubic boron nitride grains can be more than or equal to 10 volume % and less than or equal to 30 volume %, and the content of the cobalt can be more than or equal to 5 volume % and less than or equal to 15 volume %. In such a composite sintered material, the strength becomes high to result in high chipping resistance in addition to the high wear resistance and the high breakage resistance.

[3] In the composite sintered material according to the present embodiment, the average grain size of the aluminum oxide grains can be less than or equal to 0.2 μm. Such a compound sintered material has higher breakage resistance and higher chipping resistance.

[4] In the composite sintered material according to the present embodiment, the content of the aluminum oxide grains can be more than or equal to 3 volume % and less than or equal to 10 volume %. In such a composite sintered material, the strength becomes high to result in high chipping resistance in addition to the high wear resistance and the high breakage resistance.

[5] In the composite sintered material according to the present embodiment, in a visual field having a longitudinal side of 18 μm and a lateral side of 23 μm within an arbitrarily specified cross section, ten straight lines can be drawn in a longitudinal direction and ten straight lines can be drawn in a lateral direction in a form of a lattice to divide the visual field into eleven equal portions in the longitudinal direction and divide the visual field into eleven equal portions in the lateral direction, and a ratio of the number of line segments in each of which a distance between adjacent aluminum oxide grains of aluminum oxide grains located on each straight line and having a grain size of more than or equal to 0.1 μm is more than or equal to 0.2 μm with respect to the total number of line segments each connecting between corresponding adjacent aluminum oxide grains can be more than or equal to 90%. In such a composite sintered material, the strength becomes high to result in high chipping resistance in addition to the high wear resistance and the high breakage resistance.

[6] In the composite sintered material according to the present embodiment, in a visual field having a longitudinal side of 18 μm and a lateral side of 23 μm within an arbitrarily specified cross section, ten straight lines can be drawn in a longitudinal direction and ten straight lines can be drawn in a lateral direction in a form of a lattice to divide the visual field into eleven equal portions in the longitudinal direction and divide the visual field into eleven equal portions in the lateral direction, and a ratio of the number of line segments in each of which a distance between adjacent aluminum oxide grains of aluminum oxide grains located on each straight line and having a grain size of more than or equal to 0.1 μm is more than or equal to 0.5 μm with respect to the total number of line segments each connecting between corresponding adjacent aluminum oxide grains can be more than or equal to 90%. In such a composite sintered material, the strength becomes high to result in high chipping resistance in addition to the high wear resistance and the high breakage resistance.

[7] In the composite sintered material according to the present embodiment, less than or equal to one aluminum oxide grain having a grain size of more than or equal to 1 μm can exist in a visual field having a longitudinal side of 18 μm and a lateral side of 23 μm within an arbitrarily specified cross section. Such a composite sintered material has higher breakage resistance.

[8] In the composite sintered material according to the present embodiment, less than or equal to three aluminum oxide grains each having a grain size of more than or equal to 0.5 μm can exist in a visual field having a longitudinal side of 18 μm and a lateral side of 23 μm within an arbitrarily specified cross section. Such a composite sintered material has higher breakage resistance.

[9] In the composite sintered material according to the present embodiment, the binder phase can further include a chemical component including at least one element selected from a group consisting of tungsten, titanium, zirconium, hafnium, niobium, tantalum, chromium, aluminum, silicon, and molybdenum, and in the binder phase, the content of the cobalt can be more than or equal to 50 mass % and less than or equal to 99.5 mass %, and a content of the chemical component can be more than or equal to 0.5 mass % and less than or equal to 50 mass %. In such a composite sintered material, the strength becomes high to result in high chipping resistance in addition to the high wear resistance and the high breakage resistance.

[10] In the composite sintered material according to the present embodiment, at least a part of the binder phase can be at least one of a carbide, a carbonitride, a nitride, an oxide, an oxynitride, and a boride. Such a composite sintered material has both high wear resistance and high breakage resistance, and the wear resistance is particularly high.

[11] A composite sintered material according to the present embodiment includes a plurality of diamond grains having an average grain size of less than or equal to 2 μm; a plurality of cubic boron nitride grains having an average grain size of less than or equal to 1 μm; a plurality of aluminum oxide grains having an average grain size of less than or equal to 0.2 μm; and a remainder of a binder phase, wherein at least parts of adjacent diamond grains can be bound to one another, the binder phase can include cobalt and a chemical component including at least one element selected from a group consisting of tungsten, titanium, zirconium, hafnium, niobium, tantalum, chromium, aluminum, silicon, and molybdenum, and in the binder phase, a content of the cobalt can be more than or equal to 50 mass % and less than or equal to 99.5 mass %, and a content of the chemical component can be more than or equal to 0.5 mass % and less than or equal to 50 mass %, at least a part of the binder phase can be at least one of a carbide, a carbonitride, a nitride, an oxide, an oxynitride, and a boride, in the composite sintered material, a content of the diamond grains can be more than or equal to 50 volume % and less than or equal to 70 volume %, a content of the cubic boron nitride grains can be more than or equal to 10 volume % and less than or equal to 30 volume %, a content of the aluminum oxide grains can be more than or equal to 2 volume % and less than or equal to 15 volume %, and a content of the cobalt can be more than or equal to 5 volume % and less than or equal to 15 volume %, in a visual field having a longitudinal side of 18 μm and a lateral side of 23 μm within an arbitrarily specified cross section, ten straight lines can be drawn in a longitudinal direction and ten straight lines are drawn in a lateral direction in a form of a lattice to divide the visual field into eleven equal portions in the longitudinal direction and divide the visual field into eleven equal portions in the lateral direction, and a ratio of the number of line segments in each of which a distance between adjacent aluminum oxide grains of aluminum oxide grains located on each straight line and having a grain size of more than or equal to 0.1 μm is more than or equal to 0.2 μm with respect to the total number of line segments each connecting between corresponding adjacent aluminum oxide grains can be more than or equal to 90%, and less than or equal to one aluminum oxide grain having a grain size of more than or equal to 1 μm can exist in the visual field having the longitudinal side of 18 μm and the lateral side of 23 μm within the arbitrarily specified cross section. Such a composite sintered material has both high wear resistance and high breakage resistance.

DETAILS OF EMBODIMENTS OF THE PRESENT DISCLOSURE

<Composite Sintered Material>

A composite sintered material according to the present embodiment includes: a plurality of diamond grains having an average grain size of less than or equal to 10 μm; a plurality of cBN (cubic boron nitride) grains having an average grain size of less than or equal to 2 μm; a plurality of $Al_2O_3$ (aluminum oxide) grains having an average grain size of less than or equal to 0.5 μm; and a remainder of a binder phase, wherein at least parts of adjacent diamond grains are bound to one another, the binder phase includes Co (cobalt), in the composite sintered material, a content of the diamond grains is more than or equal to 30 volume % and less than or equal to 92 volume %, a content of the cBN grains is more than or equal to 3 volume % and less than or equal to 40 volume %, a content of the $Al_2O_3$ grains is more than or equal to 2 volume % and less than or equal to 15 volume %, and a content of the Co is more than or equal to 3 volume % and less than or equal to 30 volume %. The composite sintered material according to the present embodiment has both high wear resistance and high breakage resistance because the diamond grains, the cBN grains, and the $Al_2O_3$ grains are combined.

The present inventors used a cBN sintered material to form an end mill, which is one type of cutting tool. The present inventors found that when the end mill just before a cutting edge thereof was chipped was observed during processing of a heat-resistant alloy (for example, Inconel (registered trademark) 718) including an iron group element, a crack generated inside the cutting edge of the end mill extended through a cBN grain. Accordingly, it was found that toughness and strength of the cBN grains are insufficient for a tool for processing a heat-resistant alloy including an iron group element and/or titanium, and the performance thereof is not expected to be greatly improved by continuously modifying the cBN sintered material in the conventional manner.

Next, the present inventors formed an end mill using a diamond sintered material, which is not used normally, because it was considered that a cutting distance per cutting edge was short and a temperature of the cutting edge was less likely to be increased in high-speed processing of a heat-resistant alloy including an iron group element and/or titanium by the end mill. Then, the present inventors processed a heat-resistant alloy (for example, Inconel (registered trademark) 718) including an iron group element. As a result, chipping, which frequently occurs in the end mill formed using the cBN sintered material, did not occur in the end mill formed using the diamond sintered material. However, a wear rate of the end mill formed using the diamond sintered material was higher than that of the end mill formed using the cBN sintered material, with the result that a practical tool life was not obtained.

To address this, the present inventors considered to combine diamond grains having high breakage resistance with cBN grains and $Al_2O_3$ grains both having high wear resistance. As a result, the present inventors succeeded in obtaining a composite sintered material having both high wear resistance and high breakage resistance by combining a suitable content of diamond grains for such a presumption that at least parts of the diamond grains are bound to one another to form a continuous skeleton structure with respective suitable contents of cBN grains and fine $Al_2O_3$ grains for such a presumption that the cBN grains and the fine $Al_2O_3$ grains are placed in a gap in the skeleton structure by a production process for forming the skeleton structure. Here, the $Al_2O_3$ grains can be readily made finer than the cBN grains, and therefore are likely to be uniformly dispersed and placed in the gap in the skeleton structure formed by the diamond grains.

(Diamond Grains)

The average grain size of the diamond grains is less than or equal to 10 µm and is preferably less than or equal to 2 µm in order to obtain a high-strength composite sintered material having both high wear resistance and high breakage resistance. Here, the grain size of each of the diamond grains is determined in the following manner. First, an arbitrarily specified cross section of the composite sintered material is produced through a CP process employing a cross section polisher (CP) apparatus or the like. Then, the diamond grains are identified in the cross section through EDX (energy dispersive X-ray spectroscopy). Then, assuming that the diamond grains are dispersed homogeneously in the composite sintered material, the equivalent circle diameter of each grain is calculated using image analysis software based on the cross sectional area of the grain, and is regarded as the above-described grain size. The average grain size of the diamond grains is obtained by calculating the average of the grain sizes of the above-described grains.

The content of the diamond grains in the composite sintered material is more than or equal to 30 volume % and less than or equal to 92 volume %, and is preferably more than or equal to 50 volume % and less than or equal to 70 volume % in view of suitability for forming the continuous skeleton structure in which at least parts of the diamond grains are bound to one another. Here, the content of the diamond grains in the composite sintered material is calculated in the following manner. First, in the arbitrarily specified cross section of the composite sintered material, the diamond grains are identified by EDX (energy dispersive X-ray spectroscopy). Next, assuming that the diamond grains are dispersed homogeneously in the composite sintered material, an area % of a cross sectional area of the diamond grains with respect to the total area of the cross section is regarded as a volume %. In this way, the above-described content is calculated. It should be noted that the continuous skeleton structure formed by at least parts of adjacent diamond grains being bound to one another in the composite sintered material is observed by SEM (scanning electron microscope).

(Cubic Boron Nitride Grains)

The average grain size of the cBN (cubic boron nitride) grains is less than or equal to 2 µm, and is preferably less than or equal to 1 µm in order to obtain a high-strength composite sintered material having both high wear resistance and high breakage resistance. Here, the grain size of each cBN grain and the average grain size of the cBN grains are calculated by the same methods as those for the diamond grains. The content of the cBN grains in the composite sintered material is more than or equal to 3 volume % and less than or equal to 40 volume %, and is preferably more than or equal to 10 volume % and less than or equal to 30 volume % in view of suitability for placing the cBN grains in the gap in the above-described skeleton structure formed by the diamond grains. Here, the content of the cBN grains in the composite sintered material is calculated in the following manner. First, in the arbitrarily specified cross section of the composite sintered material, the cBN grains are identified by EDX (energy dispersive X-ray spectroscopy). Next, assuming that the cBN grains are dispersed homogeneously in the composite sintered material, an area % of a cross sectional area of the cBN grains with respect to the total area of the cross section is regarded as a volume %. In this way, the above-described content is calculated.

(Aluminum Oxide Grains)

The average grain size of the $Al_2O_3$ (aluminum oxide) grains is less than or equal to 0.5 µm, and is preferably less than or equal to 0.2 µm in order to obtain a high-strength composite sintered material having both high wear resistance and high breakage resistance. For the $Al_2O_3$ grains, grains having a finer average grain size than those of the diamond grains and the cBN grains are used because the grains ($Al_2O_3$ grains) having high wear resistance can be placed in the whole of the sintered material without breaking the skeleton structure formed by the diamond grains. Here, the grain size of each $Al_2O_3$ grain and the average grain size of the $Al_2O_3$ grains are calculated by the same methods as those for the diamond grains. The content of the $Al_2O_3$ grains in the composite sintered material is more than or equal to 2 volume % and less than or equal to 15 volume %, and is preferably more than or equal to 3 volume % and less than or equal to 10 volume % in view of suitability for placing the $Al_2O_3$ grains in the gap in the above-described skeleton structure formed by the diamond grains. Here, the content of the $Al_2O_3$ grains in the composite sintered material is calculated as follows. First, in the arbitrarily specified cross section of the composite sintered material, $Al_2O_3$ grains are identified by EDX (energy dispersive X-ray analysis). Then, assuming that the $Al_2O_3$ grains are dispersed homogeneously in the composite sintered material, an area % of a cross sectional area of the $Al_2O_3$ grains with respect to the total area of the cross section is regarded as a volume %. In this way, the above-described content is calculated.

(Binder Phase)

The binder phase includes Co (cobalt) in order to bind at least parts of adjacent diamond grains to one another. The content of Co in the composite sintered material is more than or equal to 3 volume % and less than or equal to 30 volume %, and is preferably more than or equal to 5 volume % and less than or equal to 15 volume % in order to bind at least parts of adjacent diamond grains to one another. Here, the content of Co in the composite sintered material is calculated in the following manner. First, in the arbitrarily specified cross section of the composite sintered material, Co is identified by EDX (energy dispersive X-ray spectroscopy). Then, assuming that Co is dispersed homogeneously in the composite sintered material, an area % of a cross sectional area specified as Co with respect to the total area of the cross section is regarded as a volume %. In this way, the above-described content is calculated.

In order to increase the strength of the composite sintered material, the binder phase preferably further includes a chemical component including at least one element selected from a group consisting of W (tungsten), Ti (titanium), Zr (zirconium), Hf (hafnium), Nb (niobium), Ta (tantalum), Cr (chromium), Al (aluminum), Si (silicon) and Mo (molybdenum). In order to increase the strength of the composite sintered material by binding at least parts of adjacent diamond grains to one another, the content of Co in the binder phase is preferably more than or equal to 50 mass % and less than or equal to 99.5 mass %, and is more preferably more than or equal to 55 mass % and less than or equal to 70 mass %. Moreover, in order to increase the strength of the composite sintered material, the content of the above-described chemical component (chemical component including at least one element selected from the group consisting of W, Ti, Zr, Hf, Nb, Ta, Cr, Al, Si, and Mo) in the binder phase is preferably more than or equal to 0.5 mass % and less than or equal to 50 mass %, and is more preferably more than or equal to 30 mass % and less than or equal to 45 mass %. The respective contents of Co and the chemical component in the binder phase are calculated in the following manner. First, the CP process is performed onto the arbitrarily specified cross section of the composite sintered material. Then, in the CP-processed cross section, a mass ratio of Co and the chemical component measured through a quantitative analysis in EDX (energy dispersive X-ray spectroscopy) is determined. In this way, the above-described contents are calculated.

In order to increase the wear resistance of the composite sintered material, at least a part of the above-described chemical component (chemical component including at least one element selected from the group consisting of W, Ti, Zr, Hf, Nb, Ta, Cr, Al, Si, and Mo) included in the binder phase is preferably at least one of a carbide, a carbonitride, a nitride, an oxide, an oxynitride, and a boride. Examples thereof include: a carbide such as TiC; a carbonitride such as TiCN; a nitride such as TiN; an oxide such as $ZrO_2$ (excluding $Al_2O_3$); an oxynitride such as sialon (SiAlON); a boride such as $TiB_2$. The type of the chemical component is identified in accordance with a diffraction peak pattern of XRD (X-ray diffraction).

(Ratio of Number of Line Segments in Each of which Distance Between Aluminum Oxide Grains Each Having Grain Size of More than or Equal to Predetermined Grain Size is More than or Equal to Predetermined Distance)

When the $Al_2O_3$ (aluminum oxide) grains exist in an unbalanced manner in the composite sintered material of the present embodiment, the breakage resistance is decreased. Hence, in order to achieve high wear resistance and high breakage resistance of the composite sintered material by uniformly dispersing the fine $Al_2O_3$ grains in the composite sintered material, in a visual field having a longitudinal side of 18 μm and a lateral side of 23 μm within an arbitrarily specified cross section, ten straight lines are drawn in a longitudinal direction and ten straight lines are drawn in a lateral direction in the form of a lattice to divide the visual field into eleven equal portions in the longitudinal direction and divide the visual field into eleven equal portions in the lateral direction, and a ratio of the number of line segments in each of which a distance between adjacent $Al_2O_3$ grains of $Al_2O_3$ grains located on each straight line and having a grain size of more than or equal to 0.1 μm is more than or equal to 0.2 μm with respect to the total number of line segments each connecting between corresponding adjacent $Al_2O_3$ grains is preferably more than or equal to 90%. More preferably, the ratio of the number of the line segments in each of which the distance between the adjacent aluminum oxide grains is more than or equal to 0.5 μm is more than or equal to 90%.

Figure 1:
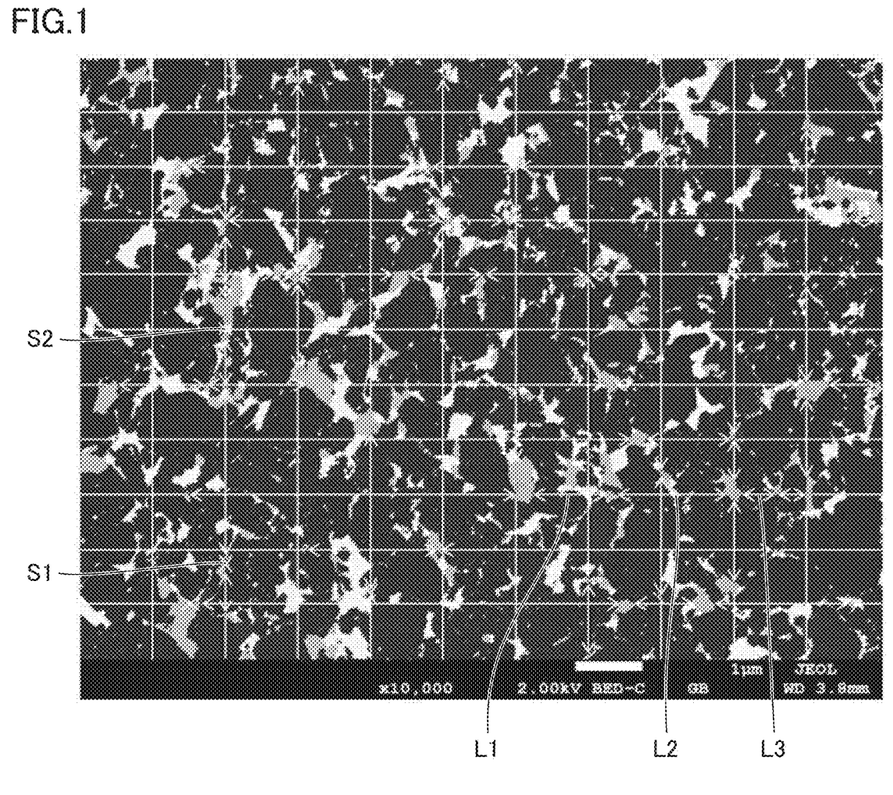
FIG. 1 shows a scanning electron microscope photograph showing an exemplary, arbitrarily specified cross section of a composite sintered material according to a certain embodiment of the present disclosure.
Figure 2:
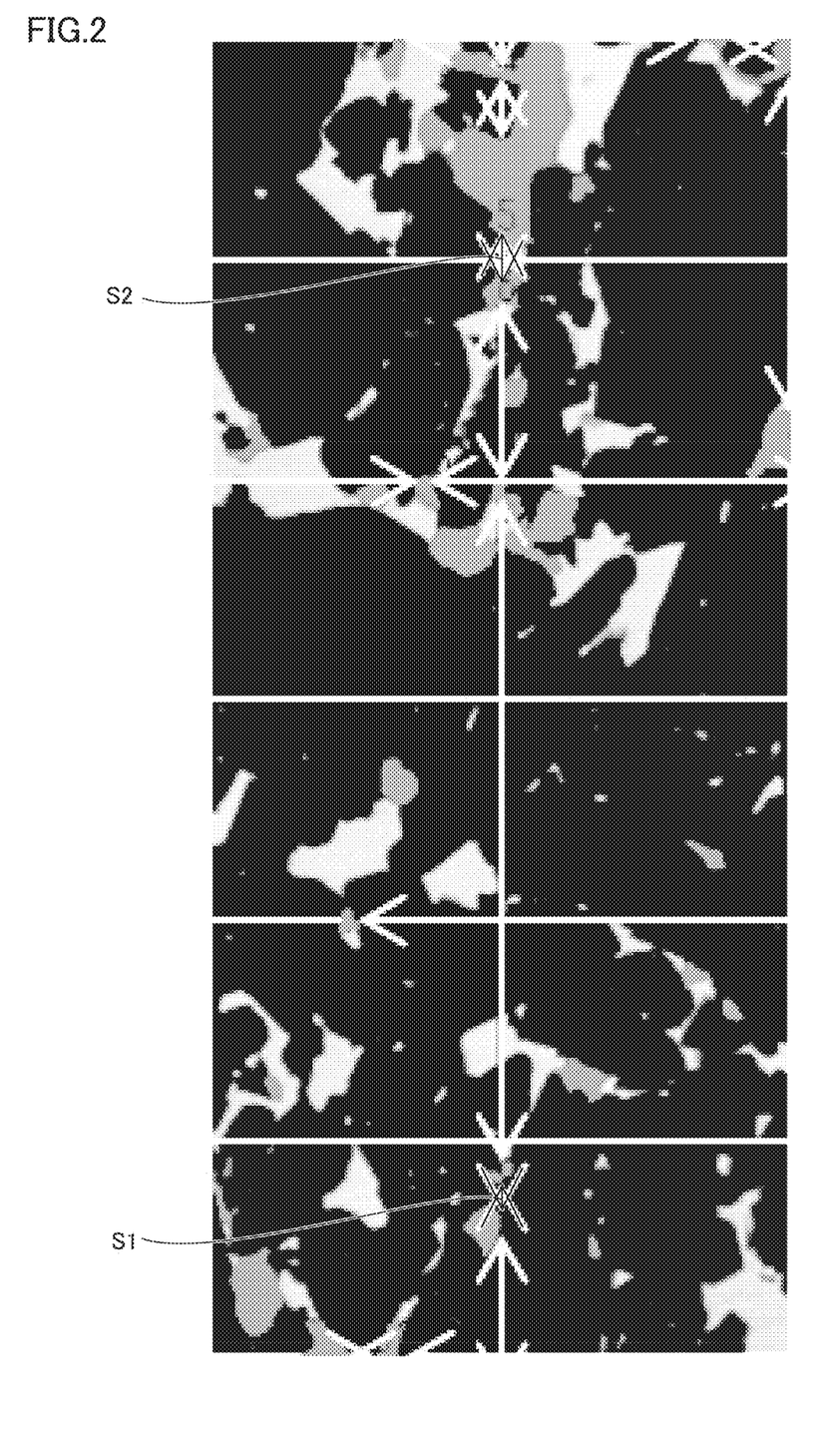
FIG. 2 shows an enlarged scanning electron microscope photograph of a portion of FIG. 1.

Specifically, with reference to FIG. 1, first, a SEM (scanning electron microscope) photograph of an arbitrarily specified cross section of the composite sintered material of the present embodiment is captured. The diamond grains, the cBN grains, the $Al_2O_3$ grains, and the binder phase, each of which is identified by EDX, are distinguished and visualized using image analysis software based on a color difference and/or a brightness difference. For example, in the SEM photograph of FIG. 1, black portions represent the diamond grains or the cBN grains, gray portions represent the $Al_2O_3$ grains, and white portions represent the binder phase. Next, in a visual field having a longitudinal side of 18 μm and a lateral side of 23 μm within this SEM photograph, ten straight lines are drawn in a longitudinal direction and ten straight lines are drawn in a lateral direction in the form of a lattice to divide the visual field into eleven equal portions in the longitudinal direction and divide the visual field into eleven equal portions in the lateral direction. Next, adjacent $Al_2O_3$ grains of $Al_2O_3$ grains located on each straight line (i.e., each of the ten straight lines extending in the lateral direction and the ten straight lines extending in the longitudinal direction) and having a grain size of more than or equal to 0.1 μm are connected to each other by line segments (line segments each having both ends provided with arrows in FIG. 1). For example, in FIG. 1 and FIG. 2, each of line segments S1 and S2 represents a line segment in which a distance between the $Al_2O_3$ grains is less than 0.2 μm (i.e., a line segment having a length of less than 0.2 μm). Each of line segments L1, L2, and L3 represents a line segment in which a distance between the $Al_2O_3$ grains is more than or equal to 0.2 μm (i.e., a line segment having a length of more than or equal to 0.2 μm).

Next, the total number of the line segments obtained as described above and connecting between the adjacent $Al_2O_3$ grains is counted. Here, the line segment connecting between the adjacent $Al_2O_3$ grains refers to a line segment in which $Al_2O_3$ grains located at the both ends of the line segment are within a visual field having a longitudinal side of 18 μm and a lateral side of 23 μm. Therefore, the line segment connecting between the adjacent $Al_2O_3$ grains does not include a line segment extending from an $Al_2O_3$ grain to outside of the visual field having a longitudinal side of 18 μm and a lateral side of 23 μm. For example, regarding the laterally extending straight lines including line segment L1, line segment L2, and line segment L3 in FIG. 1, the line segments each connecting between corresponding adjacent $Al_2O_3$ grains refer to five line segments except for line segments at the both ends of the above-described straight line.

Next, among the line segments each connecting between corresponding adjacent $Al_2O_3$ grains, the number of line segments in each of which a distance between adjacent $Al_2O_3$ grains is more than or equal to 0.2 μm (i.e., line segments each having a length of more than or equal to 0.2 μm, such as line segment L1, line segment L2, and line segment L3) is counted. Next, the number of the line segments in each of which the distance between the adjacent $Al_2O_3$ grains is more than or equal to 0.2 μm is divided by the total number of the line segments each connecting between corresponding adjacent $Al_2O_3$ grains so as to indicate a percentage. Accordingly, a ratio of the number of the line segments in each of which the distance between the adjacent $Al_2O_3$ grains is more than or equal to 0.2 μm with respect to the total number of the line segments each connecting between corresponding adjacent $Al_2O_3$ grains is calculated.

Moreover, in the description above, among the line segments each connecting between corresponding adjacent $Al_2O_3$ grains, the number of the line segments in each of which the distance between the adjacent $Al_2O_3$ grains is more than or equal to 0.5 μm (i.e., line segments each having a length of more than or equal to 0.5 μm) is counted. Then, the number of the line segments in each of which the distance between the adjacent $Al_2O_3$ grains is more than or equal to 0.5 μm is divided by the total number of the line segments each connecting between corresponding adjacent $Al_2O_3$ grains so as to indicate a percentage. Accordingly, a ratio of the number of the line segments in each of which the distance between the adjacent $Al_2O_3$ grains is more than or equal to 0.5 μm with respect to the total number of the line segments each connecting between corresponding adjacent $Al_2O_3$ grains is calculated.

(Number of Aluminum Oxide Grains Each Having Grain Size of More than or Equal to Predetermined Grain Size)

Preferably in the composite sintered material of the present embodiment, in order to achieve higher breakage resistance of the composite sintered material by reducing the number of $Al_2O_3$ (aluminum oxide) grains having large grain sizes, less than or equal to one aluminum oxide grain having a grain size of more than or equal to 1 μm exists in the visual field having a longitudinal side of 18 μm and a lateral side of 23 μm within the arbitrarily specified cross section, or less than or equal to three aluminum oxide grains each having a grain size of more than or equal to 0.5 μm exist in the visual field having a longitudinal side of 18 μm and a lateral side of 23 μm within the arbitrarily specified cross section. More preferably, less than or equal to one aluminum oxide grain having a grain size of more than or equal to 1 μm exists in the visual field having a longitudinal side of 18 μm and a lateral side of 23 μm within the arbitrarily specified cross section, and less than or equal to three aluminum oxide grains each having a grain size of more than or equal to 0.5 μm exist in the visual field having a longitudinal side of 18 μm and a lateral side of 23 μm within the arbitrarily specified cross section.

Preferably, the composite sintered material according to the present embodiment includes: a plurality of diamond grains having an average grain size of less than or equal to 2 μm; a plurality of cBN (cubic boron nitride) grains having an average grain size of less than or equal to 1 μm; and a plurality of $Al_2O_3$ (aluminum oxide) grains having an average grain size of less than or equal to 0.2 μm; and a remainder of a binder phase, wherein at least parts of adjacent diamond grains are bound to one another, the binder phase includes Co (cobalt) and a chemical component including at least one element selected from a group consisting of W (tungsten), Ti (titanium), Zr (zirconium), Hf (hafnium), Nb (niobium), Ta (tantalum), Cr (chromium), Al (aluminum), Si (silicon) and Mo (molybdenum), and in the binder phase, a content of the Co is more than or equal to 50 mass % and less than or equal to 99.5 mass %, and a content of the chemical component is more than or equal to 0.5 mass % and less than or equal to 50 mass %, at least a part of the binder phase is at least one of a carbide, a carbonitride, a nitride, an oxide, an oxynitride, and a boride, in the composite sintered material, a content of the diamond grains is more than or equal to 50 volume % and less than or equal to 70 volume %, a content of the cBN grains is more than or equal to 10 volume % and less than or equal to 30 volume %, a content of the $Al_2O_3$ grains is more than or equal to 2 volume % and less than or equal to 15 volume %, and a content of the Co is more than or equal to 5 volume % and less than or equal to 15 volume %, in a visual field having a longitudinal side of 18 μm and a lateral side of 23 μm within an arbitrarily specified cross section, ten straight lines are drawn in a longitudinal direction and ten straight lines are drawn in a lateral direction in a form of a lattice to divide the visual field into eleven equal portions in the longitudinal direction and divide the visual field into eleven equal portions in the lateral direction, and a ratio of the number of line segments in each of which a distance between adjacent $Al_2O_3$ grains of $Al_2O_3$ grains located on each straight line and having a grain size of more than or equal to 0.1 μm is more than or equal to 0.2 μm with respect to the total number of line segments each connecting between corresponding adjacent $Al_2O_3$ grains is more than or equal to 90%, and less than or equal to one $Al_2O_3$ grain having a grain size of more than or equal to 1 μm exists in the visual field having the longitudinal side of 18 μm and the lateral side of 23 μm within the arbitrarily specified cross section. Such a composite sintered material has both high wear resistance and high breakage resistance.

<Method of Producing Composite Sintered Material>

A method of producing the composite sintered material according to the present embodiment is not particularly limited; however, in order to efficiently produce the composite sintered material of the present embodiment, the method of producing the composite sintered material according to the present embodiment preferably includes: a first step of forming binder-coated diamond powder by coating at least a portion of a surface of each particle of the diamond powder with a binder including Co; a second step of forming a mixture by mixing the binder-coated diamond powder, cBN powder, and $Al_2O_3$ powder; and a third step of forming the composite sintered material by sintering the mixture.

(First Step)

In the first step, the binder-coated diamond powder is formed by coating at least a portion of the surface of each particle of the diamond powder with the binder including Co. By sintering the mixture of the binder-coated diamond powder, the cBN powder and the $Al_2O_3$ powder in the subsequent step, the composite sintered material of the present embodiment is obtained.

The average particle size of the diamond powder used in the first step is not particularly limited, but is less than or equal to 10 μm, and is preferably less than or equal to 2 μm in order to form a composite sintered material having high strength, high wear resistance and high breakage resistance. A method for coating at least a portion of the surface of each particle of the diamond powder with the binder including Co is not particularly limited, but is preferably an electroless plating method, an arc deposition method, a powder sputtering method, or the like in order to attain a small amount of impurity and uniform coating. In order to form a composite sintered material having high strength, high wear resistance and high breakage resistance, the binder preferably includes not only Co but also a chemical component including at least one element selected from a group consisting of W, Ti, Zr, Hf, Nb, Ta, Cr, Al, Si, and Mo. In the subsequent step, the binder forms the binder phase in the composite sintered material.

(Second Step)

In the second step, the mixture is formed by mixing the binder-coated diamond powder, the cBN powder and the $Al_2O_3$ powder. Here, the mixing of the Co-coated diamond powder and the cBN powder with the $Al_2O_3$ powder is preferably performed in the following manner. That is, in order to obtain $Al_2O_3$ particles having a small average particle size, the $Al_2O_3$ powder is pulverized using a bead mill or the like in a slurry state in which the $Al_2O_3$ powder is preferably dispersed in a dispersion medium, and the $Al_2O_3$ powder still in the slurry state is mixed with the Co-coated diamond powder and the cBN powder to avoid re-aggregation. By sintering this mixture in the subsequent step, the composite sintered material of the present embodiment is obtained. Moreover, in order to adjust an amount of the binder in the sintered material, the binder can also be added in this step. The first step can be skipped when the binder is added in the second step; however, it is preferable to perform the first step. When the first step is skipped, the mixture is formed by mixing the diamond powder, the cBN powder, and the $Al_2O_3$ powder in the second step.

The average particle size of the cBN powder used in the second step is not particularly limited, but is less than or equal to 2 μm and is preferably less than or equal to 1 μm in order to form a composite sintered material having high strength, high wear resistance and high breakage resistance. The average particle size of the $Al_2O_3$ powder used in the second step is not particularly limited, but is less than or equal to 0.5 μm and is preferably less than or equal to 0.2 μm in order to form a composite sintered material having high strength, high wear resistance and high breakage resistance. Since the $Al_2O_3$ particles are likely to be aggregated, the $Al_2O_3$ particles are pulverized in the slurry state in which the $Al_2O_3$ particles are dispersed in the dispersion medium in advance, and then the $Al_2O_3$ particles still in the slurry state is mixed with the binder-coated diamond powder and the cBN powder to avoid re-aggregation. A method of pulverizing the $Al_2O_3$ particles is not particularly limited; however, it is preferable to use a bead mill, a planetary mill, or the like in order to pulverize into fine particles. A method of mixing the binder-coated diamond powder, the cBN powder, and the $Al_2O_3$ powder is not particularly limited; however, it is preferable to employ ball mill mixing, bead mill mixing, planetary mill mixing, jet mill mixing, or the like in order to attain efficient and homogeneous mixing. Moreover, as described above, the binder can be also mixed on this occasion. By adjusting the amount of the binder-coated diamond powder (that is, the amount of the diamond powder and the amount of the binder relative to the diamond powder), the amount of the cBN powder, the amount of the $Al_2O_3$ powder, and the contents of Co and the chemical component in the binder, it is possible to obtain: a desired content of the diamond grains, a desired content of the cBN grains, a desired content of the $Al_2O_3$ powder, and a desired content of Co in the composite sintered material; and a desired content of Co and a desired content of the chemical component in the binder phase.

(Third Step)

In the third step, the composite sintered material is formed by sintering the mixture. Conditions in sintering the mixture are not particularly limited, but in order to obtain the composite sintered material of the present embodiment efficiently, a sintering pressure is preferably more than or equal to 4 GPa and less than or equal to 10 GPa and is more preferably more than or equal to 6 GPa and less than or equal to 8 GPa, a sintering temperature is preferably more than or equal to 1400° C. and less than or equal to 2000° C. and is more preferably more than or equal to 1500° C. and less than or equal to 1800° C. In order to form the skeleton structure of the diamond grains, a longer sintering time is more preferable. The sintering time is preferably more than or equal to 15 minutes and less than or equal to 60 minutes. Normally, although abnormal grain growth is resulted when fine diamond particles are sintered for a long time under a high-pressure of more than or equal to 6 GPa and a high temperature of more than or equal to 1500° C., the cBN grains and the $Al_2O_3$ grains are placed in the diamond lattice in the present embodiment to suppress abnormal grain growth, whereby sintering can be performed for a longer time than that in the conventional art.

EXAMPLES

Example I

In the present example, composite sintered materials having different average grain sizes and contents of the diamond grains, the cBN grains, and the $Al_2O_3$ powder as well as different contents of the binder phases were produced as shown in No. I-1 to No. I-19 and No. I-R1 to No. I-R4, No. I-R6, and No. I-R8 to No. I-R10 of Table 1 to Table 3. In a visual field obtained through a SEM (electron microscope) and having a longitudinal side of 18 μm and a lateral side of 23 μm within an arbitrarily specified cross section of each of the produced composite sintered materials, ten straight lines were drawn in a longitudinal direction and ten straight lines were drawn in a lateral direction in the form of a lattice to divide the visual field into eleven equal portions in the longitudinal direction and divide the visual field into eleven equal portions in the lateral direction. Next, a ratio of the number of line segments in each of which a distance between adjacent $Al_2O_3$ grains of $Al_2O_3$ grains located on each straight line and having a grain size of more than or equal to 0.1 μm is more than or equal to 0.2 μm with respect to the total number of line segments each connecting between corresponding adjacent $Al_2O_3$ grains was calculated, and a ratio of the number of line segments in each of which the distance between the adjacent $Al_2O_3$ grains is more than or equal to 0.5 μm was calculated. Moreover, in the visual field obtained through a SEM (electron microscope) and having a longitudinal side of 18 μm and a lateral side of 23 μm within the arbitrarily specified cross section of each of the produced composite sintered materials, the $Al_2O_3$ grains each having a grain size of more than or equal to 1 μm and the $Al_2O_3$ grains each having a grain size of more than or equal to 0.5 μm were calculated. Further, cutting tools were produced using these composite sintered materials, and respective wear widths of flank faces of cutting edges thereof in high-speed cutting of Inconel (registered trademark) 718 were measured to evaluate respective lives thereof.

Each of the composite sintered materials was produced as follows. A surface of each particle of diamond powder having an average particle size shown in each of Table 1 to Table 3 was coated, by the electroless plating method, with 6 mass % of Co serving as the binder with respect to the diamond particle. $Al_2O_3$ powder having an average particle size shown in each of Table 1 to Table 3 was pulverized by a bead mill in a slurry state in which the $Al_2O_3$ powder was dispersed in ethanol serving as a dispersion medium. Then, the Co-coated diamond powder, the cBN powder having an average particle size shown in each of Table 1 to Table 3, and the pulverized $Al_2O_3$ powder in the slurry state were wet-blended by the ball mill method to produce a mixture, and the mixture was subjected to a vacuum heat treatment at 1200° C. for 30 minutes in order to remove gas on the particle surface. This mixture was introduced into a container composed of Ta (tantalum) with the mixture being in contact with a WC-6% Co cemented carbide disc and a Co foil, and was sintered by holding the mixture for 10 minutes at a pressure of 6 GPa and a temperature of 1650° C. using a belt type ultra-high pressure and high temperature generator, thereby producing the composite sintered material.

The sintering is progressed in such a manner that an eutectic crystal melt of WC-6% Co and Co is infiltrated into the composite sintered material from the WC-6% Co cemented carbide disc and the Co foil during the sintering. Hence, the respective contents of the diamond grains, the cBN grains and the $Al_2O_3$ grains, and the composition of the binder phase in the composite sintered material are slightly different from those in the prepared composition of the mixture. Hence, the prepared composition of the mixture was designed in view of an expected amount of the infiltrated eutectic crystal melt.

When the arbitrarily specified cross section of the produced composite sintered material was polished using an argon ion beam and the structure of the composite sintered material was observed using SEM (electron microscope), a continuous skeleton structure in which at least parts of the diamond grains were bound to one another was observed in the case of each of No. I-1 to No. I-19 and No. I-R1 to No. I-R4, No. I-R6, and No. I-R8 to No. I-R9. Moreover, the respective contents of the diamond grains, the cBN grains, the $Al_2O_3$ grains and the Co of the binder phase in the composite sintered material were calculated as follows. First, EDX (energy dispersive X-ray analysis) was employed to identify the diamond grains, the cBN grains, the $Al_2O_3$ grains, and the binder phase. Then, image analysis software (WinROOF provided by Mitani Corporation) was employed to calculate an area % of a cross sectional area of each of the diamond grains, the cBN grains, the $Al_2O_3$ grains, and the binder phase with respect to the total area of the cross section. Next, it was assumed that the diamond grains, the cBN grains, the $Al_2O_3$ grains, and the binder phase were homogeneously dispersed in the composite sintered material. Based on such an assumption, the above-described area % was regarded as a volume %. In this way, the respective contents of the diamond grains, the cBN grains, the $Al_2O_3$ grains and the Co of the binder phase were calculated. Regarding the grain sizes, the grain size of each of the grains and the average grain size thereof were calculated in the same manner as in the measurement of the contents by identifying each grain by EDX and calculating the equivalent circle diameter based on the cross sectional area of each grain using the image analysis software (WinROOF provided by Mitani Corporation).

Moreover, a SEM photograph of an arbitrarily specified cross section of the composite sintered material was captured, and the diamond grains, the cBN grains, the $Al_2O_3$ grains, and the binder phase were identified based on a color difference and/or a brightness difference using image analysis software (WinROOF provided by Mitani Corporation). In a visual field having a longitudinal side of 18 μm and a lateral side of 23 μm in the identified SEM photograph, ten straight lines were drawn in the longitudinal direction and ten straight lines were drawn in the lateral direction in the form of a lattice to divide the visual field into eleven equal portions in the longitudinal direction and divide the visual field into eleven equal portions in the lateral direction (at an interval of 1.636 μm in the longitudinal direction and at an interval of 2.091 μm in the lateral direction). Next, adjacent $Al_2O_3$ grains of $Al_2O_3$ grains located on each straight line (i.e., each of the ten straight lines extending in the lateral direction and the ten straight lines extending in the longitudinal direction) and having a grain size of more than or equal to 0.1 μm were connected to each other by line segments, and the total number of the line segments was counted. Here, each line segment connecting between adjacent $Al_2O_3$ grains refers to a line segment in which $Al_2O_3$ grains located at the both ends of the line segment are within the visual field having a longitudinal side of 18 μm and a lateral side of 23 μm. Therefore, the line segment connecting between the adjacent $Al_2O_3$ grains does not include a line segment extending from an $Al_2O_3$ grain to outside of the visual field having a longitudinal side of 18 μm and a lateral side of 23 μm.

Next, the number of the line segments in each of which a distance between adjacent $Al_2O_3$ grains of the line segments each connecting between corresponding adjacent $Al_2O_3$ grains was more than or equal to 0.2 μm (i.e., line segments each having a length of more than or equal to 0.2 μm) was counted. Next, the number of the line segments in each of which the distance between the adjacent $Al_2O_3$ grains was more than or equal to 0.2 μm was divided by the total number of the line segments each connecting between corresponding adjacent $Al_2O_3$ grains so as to indicate a percentage. Accordingly, a ratio of the number of the line segments in each of which the distance between the adjacent $Al_2O_3$ grains is more than or equal to 0.2 μm with respect to the total number of the line segments each connecting between corresponding adjacent $Al_2O_3$ grains was calculated.

Moreover, in the description above, among the line segments each connecting between corresponding adjacent $Al_2O_3$ grains, the number of the line segments in each of which the distance between the adjacent $Al_2O_3$ grains was more than or equal to 0.5 μm (i.e., line segments each having a length of more than or equal to 0.5 μm) was counted. Next, the number of the line segments in each of which the distance between the adjacent $Al_2O_3$ grains was more than or equal to 0.5 μm was divided by the total number of the line segments each connecting between corresponding adjacent $Al_2O_3$ grains so as to indicate a percentage. Accordingly, a ratio of the number of the line segments in each of which the distance between the adjacent $Al_2O_3$ grains was more than or equal to 0.5 μm with respect to the total number of the line segments each connecting between corresponding adjacent $Al_2O_3$ grains was calculated.

Moreover, in the visual field having a longitudinal side of 18 μm and a lateral side of 23 μm in the identified SEM photograph, the number of $Al_2O_3$ grains each having a grain size of more than or equal to 1 μm and the number of $Al_2O_3$ grains each having a grain size of more than or equal to 0.5 μm were counted.

Further, each of the above-described composite sintered materials was used to produce a cutting tool constituted of: an end mill type cutter of the RSX12032ES model (cutting diameter of 32 mm); and an insert of the RDET1204M0 model. The produced cutting tool was used to cut the upper surface of a workpiece of Inconel (registered trademark) 718 in the form of a disc having an outer diameter of 95 mm (material having been through solution treatment and age-hardening treatment as provided by Daido-Special Metals; Rockwell hardness HRC44; grain size corresponding to grain size number 9 defined in E112 of ASTM (American Society for Testing and Materials)). Cutting conditions were as follows: a cutting speed Vc was 300 m/min; a feed rate f was 0.05 mm/cutting edge; a depth of cut ap was 0.3 mm; a radial depth of cut ae was 0.3 mm; and coolant was WET (20×-diluted emulsion). Results thereof are shown in Table 1 to Table 3. "Flank Face Wear and/or Chipping Width" in each of Table 1 to Table 3 represents a value when the length of cut of the workpiece was 10 m. Moreover, "Life" in each of Table 1 to Table 3 represents a length of cut of the workpiece when the wear width of the flank face was more than 0.1 mm.

TABLE 1

| No. | | I-1 | I-2 | I-3 | I-4 | I-5 | I-6 | I-7 | I-8 | I-9 | I-10 |
|---|---|---|---|---|---|---|---|---|---|---|---|
| Diamond Grains | Average Particle Size (μm) | 2 | 2 | 2 | 2 | 2 | 2 | 2 | 2 | 2 | 2 |
| | Content (Volume %) | 60 | 60 | 60 | 60 | 60 | 60 | 60 | 60 | 60 | 60 |
| cBN Grains | Average Particle Size (μm) | 1 | 1 | 1 | 1 | 1 | 1 | 1 | 1 | 1 | 1 |
| | Content (Volume %) | 25 | 23 | 18 | 18 | 18 | 18 | 13 | 13 | 21 | 20 |
| $Al_2O_3$ Grains | Average Particle Size (μm) | 0.2 | 0.2 | 0.2 | 0.2 | 0.2 | 0.2 | 0.2 | 0.2 | 0.1 | 0.3 |
| | Content (Volume %) | 3 | 5 | 10 | 10 | 10 | 10 | 15 | 15 | 7 | 8 |
| Binder Phase | Prepared Composition of Binder (Mass %) | Co: 100 | Co: 100 | Co: 100 | Co: 100 | Co: 100 | Co: 100 | Co: 100 | Co: 100 | Co: 100 | Co: 100 |
| | Co Content (Volume %) | 10 | 10 | 10 | 10 | 10 | 10 | 10 | 10 | 10 | 10 |
| | Composition (Mass %) | Co: 85.2 W: 12.2 | Co: 84.1 W: 12.5 | Co: 86.3 W: 11.4 | Co: 85.7 W: 11.8 | Co: 84.8 W: 12.6 | Co: 84.5 W: 12.8 | Co: 86.4 W: 12.3 | Co: 86.2 W: 11.5 | Co: 85.6 W: 11.7 | Co: 85.6 W: 11.7 |
| Ratio (%) of Number of Line Segments in Each of Which Distance between $Al_2O_3$ Grains is More Than or Equal to 0.2 μm | | 98 | 97 | 95 | 85 | 90 | 94 | 93 | 91 | 95 | 97 |
| Ratio (%) of Number of Line Segments in Each of Which Distance between $Al_2O_3$ Grains is More than or Equal to 0.5 μm | | 95 | 94 | 93 | 83 | 86 | 91 | 91 | 87 | 93 | 95 |
| Number of $Al_2O_3$ Grains Each Having Grain Size of More Than or Equal to 1 μm | | 0 | 0 | 0 | 0 | 1 | 2 | 0 | 0 | 0 | 0 |
| Number of $Al_2O_3$ Grains Each Having Grain Size of More Than or Equal to 0.5 μm | | 0 | 2 | 1 | 2 | 1 | 2 | 2 | 1 | 0 | 6 |
| Cutting Result | Flank Face Wear and/or Chipping Width (μm) | 80 | 69 | 66 | 92 | 78 | 90 | 80 | 60 | 41 | 44 |
| | Life (m) | 15 | 20 | 21 | 13 | 16 | 11 | 17 | 12 | 24 | 21 |
| | Notes | Example | Example | Example | Example | Example | Example | Example | Example | Example | Example |

TABLE 2

| No. | | I-11 | I-12 | I-13 | I-14 | I-15 | I-16 | I-17 | I-18 | I-19 |
|---|---|---|---|---|---|---|---|---|---|---|
| Diamond Grains | Average Particle Size (μm) | 2 | 2 | 2 | 2 | 2 | 2 | 10 | 2 | 2 |
| | Content (Volume %) | 60 | 60 | 55 | 63 | 77 | 50 | 66 | 30 | 92 |
| cBN Grains | Average Particle Size (μm) | 1 | 1 | 1 | 2 | 1 | 1 | 1 | 1 | 1 |
| | Content (Volume %) | 23 | 3 | 30 | 15 | 9 | 7 | 12 | 40 | 3 |
| $Al_2O_3$ Grains | Average Particle Size (μm) | 0.5 | 0.2 | 0.2 | 0.2 | 0.2 | 0.2 | 0.2 | 0.2 | 0.2 |
| | Content (Volume %) | 6 | 14 | 6 | 10 | 7 | 9 | 10 | 15 | 2 |
| Binder Phase | Prepared Composition of Binder (Mass %) | Co: 100 | Co: 100 | Co: 100 | Co: 100 | Co: 100 | Co: 100 | Co: 100 | Co: 100 | Co: 100 |
| | Co Content (Volume %) | 10 | 20 | 7 | 10 | 5 | 30 | 10 | 15 | 3 |
| | Composition (Mass %) | Co: 85.3 W: 13.4 | Co: 87.2 W: 11.4 | Co: 86.3 W: 12.1 | Co: 83.8 W: 11.9 | Co: 83.6 W: 12.0 | Co: 87.7 W: 10.6 | Co: 85.5 W: 12.7 | Co: 83.2 W: 11.8 | Co: 85.2 W: 12.2 |
| Ratio (%) of Number of Line Segments in Each of Which Distance between $Al_2O_3$ Grains is More Than or Equal to 0.2 μm | | 95 | 97 | 95 | 96 | 95 | 94 | 96 | 92 | 97 |
| Ratio (%) of Number of Line Segments in Each of Which Distance between $Al_2O_3$ Grains is More Than or Equal to 0.5 μm | | 92 | 93 | 92 | 94 | 92 | 91 | 90 | 90 | 95 |
| Number of $Al_2O_3$ Grains Each Having Grain Size of More Than or Equal to 1 μm | | 1 | 0 | 0 | 0 | 0 | 0 | 0 | 0 | 0 |
| Number of $Al_2O_3$ Grains Each Having Grain Size of More Than or Equal to 0.5 μm | | 20 | 3 | 2 | 2 | 1 | 2 | 1 | 1 | 0 |
| Cutting Result | Flank Face Wear and/or Chipping Width (μm) | 92 | 91 | 85 | 80 | 83 | 94 | 89 | 95 | 80 |
| | Life (m) | 12 | 13 | 12 | 14 | 13 | 11 | 11 | 10 | 14 |
| | Notes | Example | Example | Example | Example | Example | Example | Example | Example | Example |

TABLE 3

| No. | | I-R1 | I-R2 | I-R3 | I-R4 | I-R6 | I-R8 | I-R9 | I-R10 |
|---|---|---|---|---|---|---|---|---|---|
| Diamond Grains | Average Particle Size (μm) | 2 | 2 | 2 | 2 | 2 | 2 | 20 | 2 |
| | Content (Volume %) | 64 | 58 | 63 | 75 | 60 | 50 | 60 | 25 |
| cBN Grains | Average Particle Size (μm) | 1 | 1 | 1 | 1 | 4 | 1 | 1 | 1 |
| | Content (Volume %) | 20 | 10 | 15 | 2 | 16 | 5 | 15 | 40 |
| $Al_2O_3$ Grains | Average Particle Size (μm) | 0.2 | 0.2 | 1 | 0.2 | 0.2 | 0.2 | 0.2 | 0.2 |
| | Content (volume %) | 1 | 20 | 5 | 8 | 12 | 8 | 10 | 15 |
| Binder Phase | Prepared Composition of Binder (Mass %) | Co: 100 | Co: 100 | Co: 100 | Co: 100 | Co: 100 | Co: 100 | Co: 100 | Co: 100 |
| | Co Content (Volume %) | 13 | 10 | 15 | 13 | 10 | 35 | 13 | 20 |
| | Composition (Mass %) | Co: 85.6 W: 12.8 | Co: 84.1 W: 13.2 | Co: 85.2 W: 12.5 | Co: 86.8 W: 10.9 | Co: 86.2 W: 12.2 | Co: 84.5 W: 13.7 | Co: 85.5 W: 11.7 | Co: 86.4 W: 14.1 |
| Ratio (%) of Number of Line Segments in Each of Which Distance between $Al_2O_3$ Grains is More than or Equal to 0.2 μm | | 95 | 83 | 96 | 98 | 95 | 94 | 94 | 92 |
| Ratio (%) of Number of Line Segments in Each of Which Distance between $Al_2O_3$ Grains is More Than or Equal to 0.5 μm | | 92 | 80 | 94 | 97 | 93 | 90 | 92 | 90 |
| Number of $Al_2O_3$ Grains Each Having Grain Size of More Than or Equal to 1 μm | | 0 | 0 | 25 | 0 | 0 | 0 | 0 | 0 |
| Number of $Al_2O_3$ Grains Each Having Grain Size of More Than or Equal to 0.5 μm | | 2 | 1 | 80 | 2 | 1 | 1 | 1 | 1 |
| Cutting Result | Flank Face Wear and/or Chipping Width (μm) | — | — | — | — | — | — | — | — |
| | Life (m) | 4 | 2 | 1 | 4 | 2 | 1 | 1 | 1 |
| Notes | | Comparative Example | Comparative Example | Comparative Example | Comparative Example | Comparative Example | Comparative Example | Comparative Example | Comparative Example |

In each of the cutting tools produced by the composite sintered materials produced in No. I-1 to No. I-19 of Table 1 and Table 2, the flank face was not broken, the flank face wear and/or the chipping width were small, and the life was so long as to be more than or equal to 10 m irrespective of whether the life was expired due to wear or chipping in high-speed processing at a cutting speed Vc of 300 m/min onto Inconel (registered trademark) 718, which is a heat-resistant alloy composed of an alloy including an iron group element. That is, each of the cutting tools composed of the following composite sintered material had a long life even in high-speed processing at a cutting speed Vc of 300 m/min onto Inconel (registered trademark) 718, which is a heat-resistant alloy composed of an alloy containing iron: a composite sintered material including a plurality of diamond grains having an average grain size of less than or equal to 10 μm, a plurality of cBN grains having an average grain size of less than or equal to 2 μm, a plurality of $Al_2O_3$ grains having an average grain size of less than or equal to 0.5 μm, and a remainder of a binder phase, wherein at least parts of adjacent diamond grains are bound to one another, the binder phase contains Co, and in the composite sintered material, a content of the diamond grains is more than or equal to 30 volume % and less than or equal to 92 volume %, a content of the cBN grains is more than or equal to 3 volume % and less than or equal to 40 volume %, a content of the $Al_2O_3$ grains is more than or equal to 2 volume % and less than or equal to 15 volume %, and a content of Co is more than or equal to 3 volume % and less than or equal to 30 volume %.

Example II

In the present example, as shown in No. II-1 to No. II-12 of Table 4, composite sintered materials and cutting tools were produced in the same manner as in Example I except that not only Co but also a chemical component including a compound of at least one element selected from a group consisting of W, Ti, Zr, Hf, Nb, Ta, Cr, Al, Si, and Mo were used as a binder. Physical properties thereof were evaluated. Here, as a source material of the above-described chemical composition, in the case of W, Ti, Zr, Hf, Nb, Ta, Cr, Al, and Mo, fine-particle metal powder obtained using an atomizing method and having an average particle size of less than or equal to 2 μm was used. In the case of TiN, TiCN, and SiAlON, compound powder pulverized using a bead mill to an average particle size of about 0.5 μm was used. The SiAlON included β-SiAlON (β type sialon) and c-SiAlON (cubic sialon).

Moreover, cutting conditions were as follows: a cutting speed Vc was 500 m/min; a feed rate f was 0.05 mm/cutting edge; a depth of cut ap was 0.3 mm; a radial depth of cut ae was 0.3 mm; and coolant was WET (20×-diluted emulsion). Results thereof are shown in Table 4. "Flank Face Wear and/or Chipping Width" in Table 4 represents a value when the length of cut of the workpiece was 7.5 m. Moreover, "Life" in Table 4 represents the length of cut of the workpiece when the flank face wear and/or the chipping width became more than 0.1 m.

TABLE 4

| No. | | II-1 | II-2 | II-3 | II-4 | II-5 | II-6 | II-7 | II-8 | II-9 | II-10 | II-11 | II-12 |
|---|---|---|---|---|---|---|---|---|---|---|---|---|---|
| Diamond Grains | Average Particle Size (μm) | 2 | 2 | 2 | 2 | 2 | 2 | 2 | 2 | 2 | 2 | 2 | 2 |
| | Content (volume %) | 65 | 65 | 65 | 65 | 65 | 65 | 65 | 65 | 65 | 65 | 65 | 65 |
| cBN Grains | Average Particle Size (μm) | 0.5 | 0.5 | 0.5 | 0.5 | 0.5 | 0.5 | 0.5 | 0.5 | 0.5 | 0.5 | 0.5 | 0.5 |
| | Content (Volume %) | 15 | 15 | 15 | 15 | 15 | 15 | 15 | 15 | 15 | 15 | 15 | 15 |
| $Al_2O_3$ Grains | Average Particle Size (μm) | 0.2 | 0.2 | 0.2 | 0.2 | 0.2 | 0.2 | 0.2 | 0.2 | 0.2 | 0.2 | 0.2 | 0.2 |
| | Content (Volume %) | 8 | 8 | 8 | 8 | 8 | 8 | 8 | 8 | 8 | 8 | 8 | 8 |
| Binder Phase | Prepared Composition of Binder (Mass %) | Co: 90<br>W: 10 | Co: 85<br>Ti: 15 | Co: 85<br>Zr: 15 | Co: 85<br>Hf: 15 | Co: 85<br>Nb: 15 | Co: 85<br>Ta: 15 | Co: 85<br>Cr: 15 | Co: 85<br>Al: 15 | Co: 85<br>Mo: 15 | Co: 85<br>TiN: 15 | Co: 85<br>TiCN: 15 | Co: 85<br>SiAlON: 15 |
| | Co Content (Volume %) | 10 | 10 | 10 | 10 | 10 | 10 | 10 | 10 | 10 | 10 | 10 | 10 |
| | Composition (Mass %) | Co: 78.5<br>W: 18.6 | Co: 82.3<br>W: 3.2<br>Ti: 8.5 | Co: 81.5<br>W: 4.6<br>Zr: 9.4 | Co: 81.2<br>W: 3.3<br>Hf: 7.5 | Co: 81.9<br>W: 5.3<br>Nb: 8.5 | Co: 81.2<br>W: 4.2<br>Ta: 10.2 | Co: 80.4<br>W: 3.5<br>Cr: 9.3 | Co: 80.5<br>W: 4.6<br>Al: 9.8 | Co: 81.2<br>W: 3.3<br>Mo: 8.5 | Co: 82.3<br>W: 3.2<br>TiN: 8.5 | Co: 81.5<br>W: 4.6<br>TiCN: 9.4 | Co: 81.2<br>W: 3.3<br>SiAlON: 7.5 |
| Ratio (%) of Number of Line Segments in Each of Which Distance between $Al_2O_3$ Grains is More Than or Equal to 0.2 μm | | 94 | 94 | 95 | 94 | 92 | 94 | 96 | 94 | 94 | 95 | 94 | 92 |
| Ratio (%) of Number of Line Segments in Each of Which Distance between $Al_2O_3$ Grains is More than or Equal to 0.5 μm | | 91 | 92 | 92 | 93 | 91 | 92 | 94 | 92 | 92 | 92 | 93 | 91 |
| Number of $Al_2O_3$ Grains Each Having Grain Size of More Than or Equal to 1 μm | | 0 | 0 | 0 | 0 | 0 | 0 | 0 | 0 | 0 | 0 | 0 | 0 |
| Number of $Al_2O_3$ Grains Each Having Grain Size of More Than or Equal to 0.5 μm | | 0 | 1 | 2 | 1 | 0 | 1 | 1 | 1 | 0 | 1 | 2 | 1 |

TABLE 4-continued

| No. | | II-1 | II-2 | II-3 | II-4 | II-5 | II-6 | II-7 | II-8 | II-9 | II-10 | II-11 | II-12 |
|---|---|---|---|---|---|---|---|---|---|---|---|---|---|
| Cutting Result | Flank Face Wear and/or Chipping Width (μm) | 82 | 62 | 65 | 80 | 60 | 79 | 74 | 80 | 75 | 66 | 68 | 74 |
| | Life (m) | 9.2 | 12.2 | 11.5 | 10.6 | 13.1 | 12.4 | 11.8 | 9.6 | 10.2 | 13.5 | 13.2 | 11.8 |
| Notes | | Example | Example | Example | Example | Example | Example | Example | Example | Example | Example | Example | Example |

In each of the cutting tools produced by the composite sintered materials produced in No. II-1 to No. II-12 of Table 4, the flank face was not broken, the flank face wear and/or the chipping width were small, and the life was so long as to be more than or equal to 9.2 m irrespective of whether the life was expired due to wear or chipping in the high-speed processing at a cutting speed Vc of 500 m/min onto Inconel (registered trademark) 718, which is a heat-resistant alloy composed of an alloy including an iron group element. That is, each of the cutting tools composed of the following composite sintered material had a long life even in high-speed processing at a cutting speed Vc of 500 m/min onto Inconel (registered trademark) 718, which is a heat-resistant alloy composed of an alloy containing iron: a composite sintered material including a plurality of diamond grains having an average grain size of less than or equal to 10 μm, a plurality of cBN grains having an average grain size of less than or equal to 2 μm, a plurality of $Al_2O_3$ grains having an average grain size of less than or equal to 0.5 μm, and a remainder of a binder phase, wherein at least parts of adjacent diamond grains are bound to one another, the binder phase includes Co and a chemical composition including at least one element selected from a group consisting of W, Ti, Zr, Hf, Nb, Ta, Cr, Al, Si and Mo, and in the composite sintered material, a content of the diamond grains is more than or equal to 30 volume % and less than or equal to 92 volume %, a content of the cBN grains is more than or equal to 3 volume % and less than or equal to 40 volume %, a content of the $Al_2O_3$ grains is more than or equal to 2 volume % and less than or equal to 15 volume %, and a content of the Co is more than or equal to 3 volume % and less than or equal to 30 volume %.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

S1, S2, L1, L2, L3: line segment.

The invention claimed is:

1. A composite sintered material comprising: a plurality of diamond grains having an average grain size of less than or equal to 10 μm; a plurality of cubic boron nitride grains having an average grain size of less than or equal to 2 μm; a plurality of aluminum oxide grains having an average grain size of less than or equal to 0.5 μm; and a remainder of a binder phase, wherein
at least parts of adjacent diamond grains are bound to one another,
the binder phase includes cobalt,
in the composite sintered material, a content of the diamond grains is more than or equal to 30 volume % and less than or equal to 92 volume %, a content of the cubic boron nitride grains is more than or equal to 3 volume % and less than or equal to 40 volume %, a content of the aluminum oxide grains is more than or equal to 2 volume % and less than or equal to 15 volume %, and a content of the cobalt is more than or equal to 3 volume % and less than or equal to 30 volume %.

2. The composite sintered material according to claim 1, wherein
the average grain size of the diamond grains is less than or equal to 2 μm, and the average grain size of the cubic boron nitride grains is less than or equal to 1 μm, and
in the composite sintered material, the content of the diamond grains is more than or equal to 50 volume % and less than or equal to 70 volume %, the content of the cubic boron nitride grains is more than or equal to 10 volume % and less than or equal to 30 volume %, and the content of the cobalt is more than or equal to 5 volume % and less than or equal to 15 volume %.

3. The composite sintered material according to claim 1, wherein the average grain size of the aluminum oxide grains is less than or equal to 0.2 μm.

4. The composite sintered material according to claim 1, wherein the content of the aluminum oxide grains is more than or equal to 3 volume % and less than or equal to 10 volume %.

5. The composite sintered material according to claim 1, wherein in a visual field having a longitudinal side of 18 μm and a lateral side of 23 μm within an arbitrarily specified cross section, twenty straight lines are drawn, comprising ten straight lines in a longitudinal direction and ten straight lines in a lateral direction in a form of a lattice to divide the visual field into eleven equal portions in the longitudinal direction and divide the visual field into eleven equal portions in the lateral direction,
wherein for each line segment in a number of line segments on the twenty straight lines, a distance between adjacent aluminum oxide grains with a grain size of more than or equal to 0.1 μm located on each line segment is more than or equal to 0.2 μm,
wherein each line segment in a total number of line segments on the twenty straight lines is connected between corresponding adjacent aluminum oxide grains, and
wherein a ratio of the number of line segments with respect to the total number of line segments is more than or equal to 90%.

6. The composite sintered material according to claim 5, wherein for each line segment in a second number of line segments on the twenty straight lines, a distance between adjacent aluminum oxide grains with a grain size of more than or equal to 0.1 μm located on each line segment is more than or equal to 0.5 μm, and wherein a ratio of the second number of line segments with respect to the total number of the line segments is more than or equal to 90%.

7. The composite sintered material according to claim 1 wherein less than or equal to one aluminum oxide grain having a grain size of more than or equal to 1 μm exists in a visual field having a longitudinal side of 18 μm and a lateral side of 23 μm within an arbitrarily specified cross section.

8. The composite sintered material according to claim 1, wherein less than or equal to three aluminum oxide grains each having a grain size of more than or equal to 0.5 μm exist in a visual field having a longitudinal side of 18 μm and a lateral side of 23 μm within an arbitrarily specified cross section.

9. The composite sintered material according to claim 1, wherein the binder phase further includes a chemical component including at least one element selected from a group consisting of tungsten, titanium, zirconium, hafnium, niobium, tantalum, chromium, aluminum, silicon, and molybdenum, and in the binder phase, the content of the cobalt is more than or equal to 50 mass % and less than or equal to 99.5 mass %, and a content of the chemical component is more than or equal to 0.5 mass % and less than or equal to 50 mass %.

10. The composite sintered material according to claim 1, wherein at least a part of the binder phase is at least one of a carbide, a carbonitride, a nitride, an oxide, an oxynitride, and a boride.

11. A composite sintered material comprising: a plurality of diamond grains having an average grain size of less than or equal to 2 μm; a plurality of cubic boron nitride grains having an average grain size of less than or equal to 1 μm; a plurality of aluminum oxide grains having an average grain size of less than or equal to 0.2 μm; and a remainder of a binder phase, wherein at least parts of adjacent diamond grains are bound to one another, the binder phase includes cobalt and a chemical component including at least one element selected from a group consisting of tungsten, titanium, zirconium, hafnium, niobium, tantalum, chromium, aluminum, silicon, and molybdenum, and in the binder phase, a content of the cobalt is more than or equal to 50 mass % and less than or equal to 99.5 mass %, and a content of the chemical component is more than or equal to 0.5 mass % and less than or equal to 50 mass %, at least a part of the binder phase is at least one of a carbide, a carbonitride, a nitride, an oxide, an oxynitride, and a boride, in the composite sintered material, a content of the diamond grains is more than or equal to 50 volume % and less than or equal to 70 volume %, a content of the cubic boron nitride grains is more than or equal to 10 volume % and less than or equal to 30 volume %, a content of the aluminum oxide grains is more than or equal to 2 volume % and less than or equal to 15 volume %, and a content of the cobalt is more than or equal to 5 volume % and less than or equal to 15 volume %, in a visual field having a longitudinal side of 18 μm and a lateral side of 23 μm within an arbitrarily specified cross section, twenty straight lines are drawn, comprising ten straight lines in a longitudinal direction and ten straight lines in a lateral direction in a form of a lattice to divide the visual field into eleven equal portions in the longitudinal direction and divide the visual field into eleven equal portions in the lateral direction, wherein for each line segment in a number of line segments on the twenty straight lines, a distance between adjacent aluminum oxide grains with a grain size of more than or equal to 0.1 μm located on each line segment is more than or equal to 0.2 μm, wherein each line segment in a total number of line segments on the twenty straight lines is connected between corresponding adjacent aluminum oxide grains, a ratio of the number of line segments with respect to the total number of line segments is more than or equal to 90%, and less than or equal to one aluminum oxide grain having a grain size of more than or equal to 1 μm exists in the visual field having the longitudinal side of 18 μm and the lateral side of 23 μm within the arbitrarily specified cross section.

* * * * *